May 8, 1945. A. A. KOTTMANN 2,375,231
SLICING MACHINE
Filed Sept. 19, 1941 4 Sheets-Sheet 1
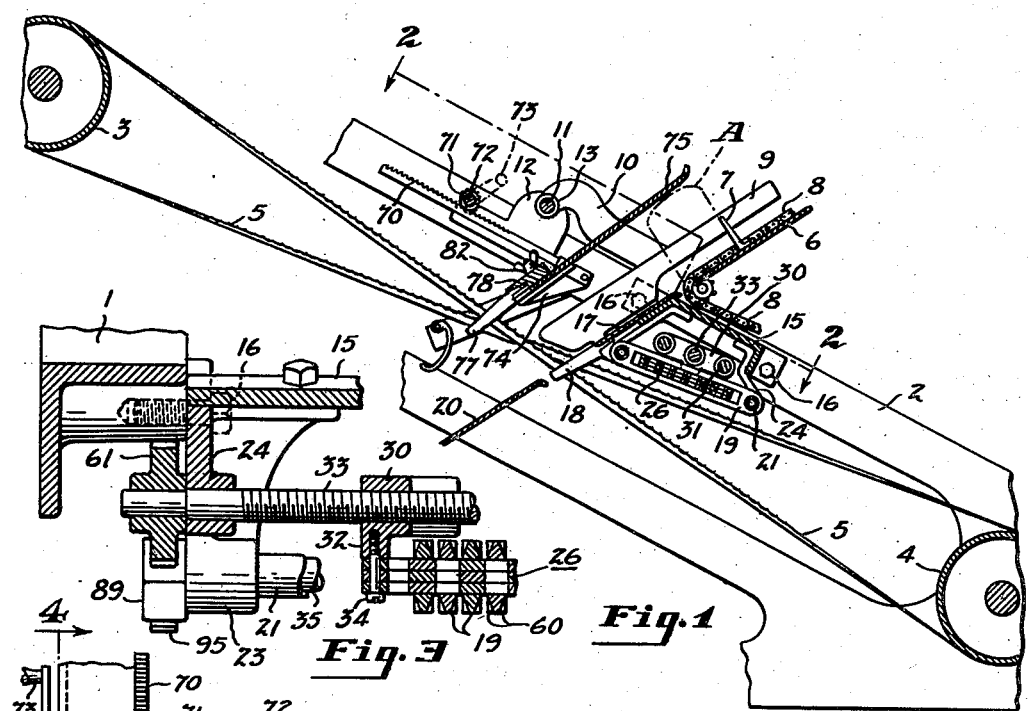

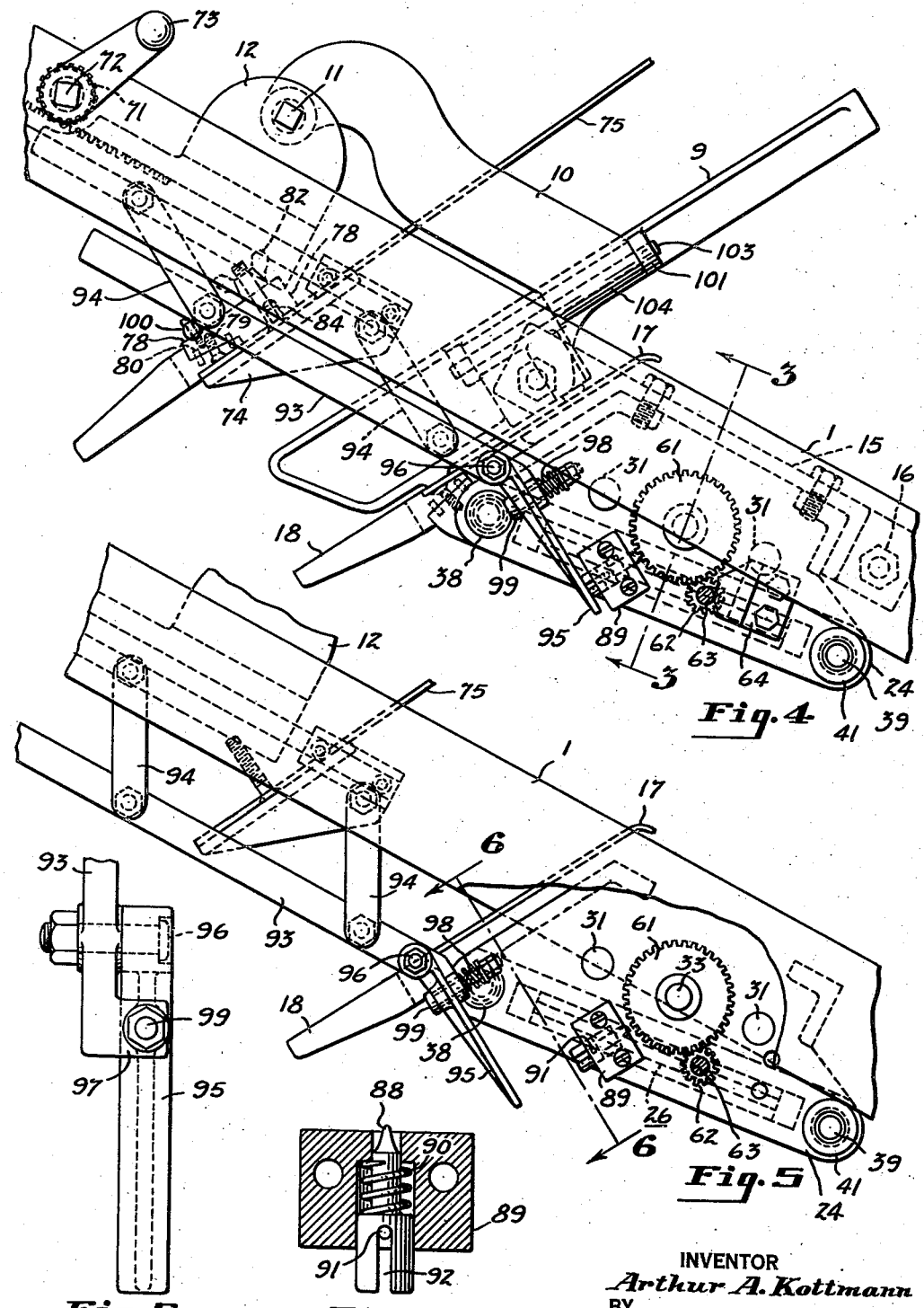

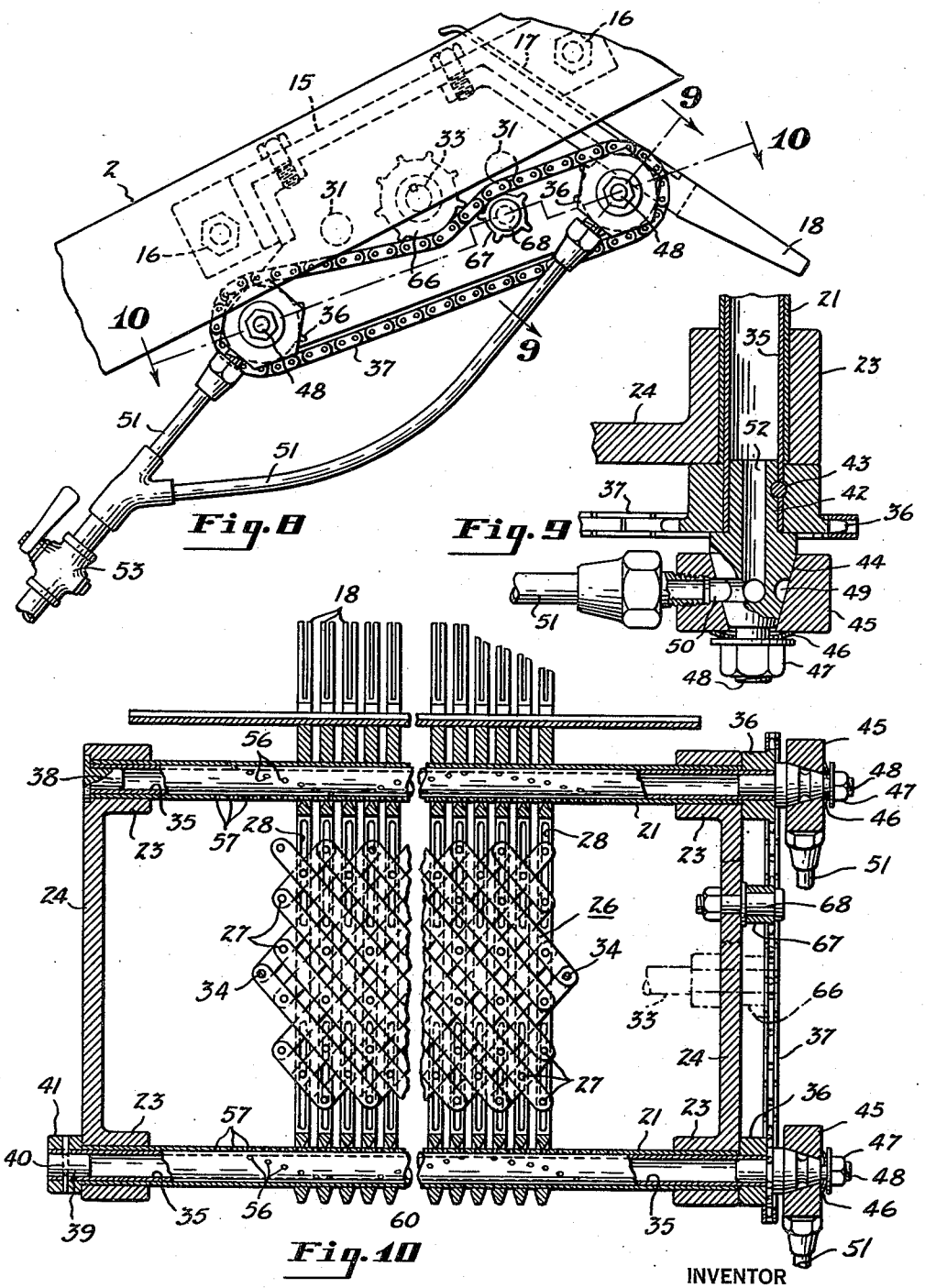

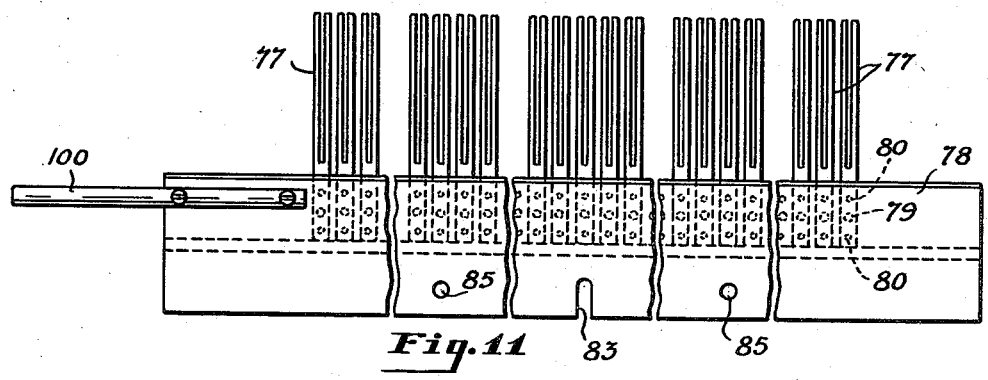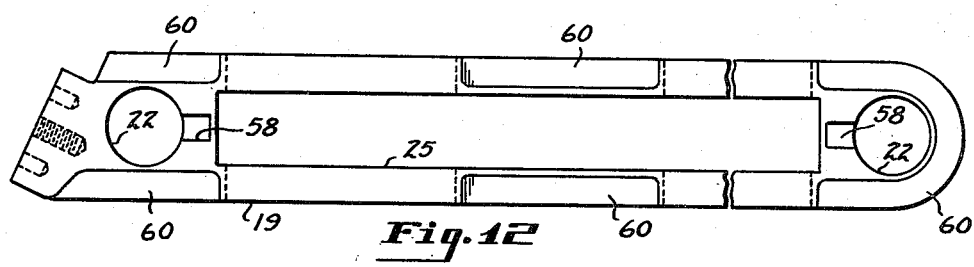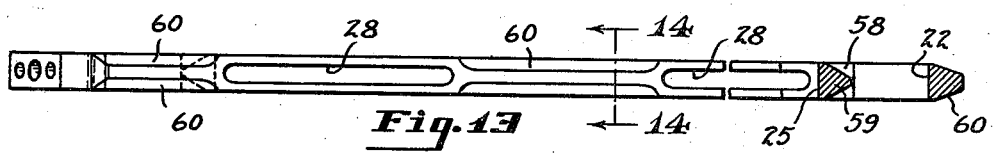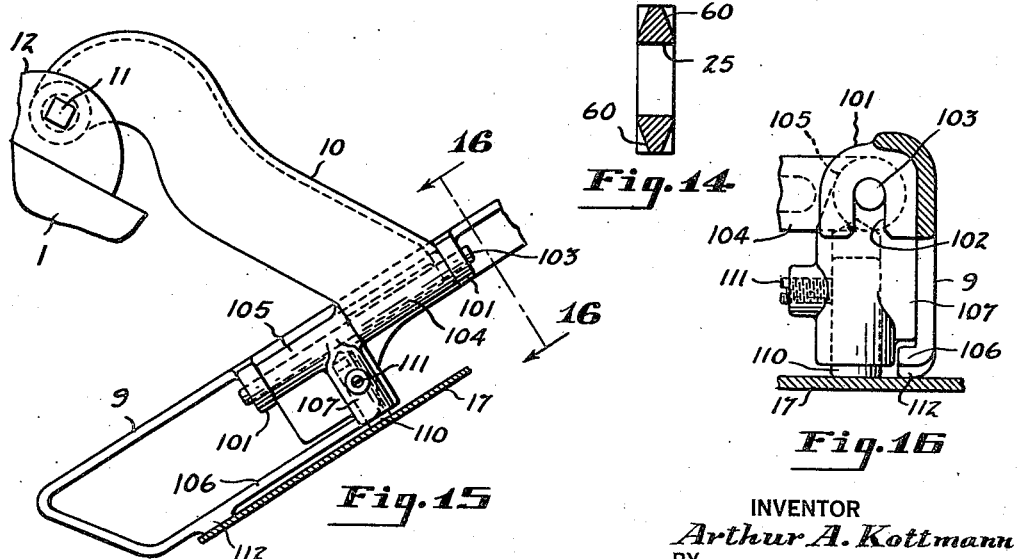

Patented May 8, 1945

2,375,231

UNITED STATES PATENT OFFICE 2,375,231

SLICING MACHINE

Arthur A. Kottmann, Davenport, Iowa, assignor, by mesne assignments, to The Bettendorf Company, a corporation of Maryland Application September 19, 1941, Serial No. 411,546

18 Claims. (Cl. 146—88)

This invention relates to bread slicing machines, and has particular reference to improvements in adjustable mechanism for spacing and guiding movable cutters and for guiding bread loaves as they move into the cutters.

It is an object of the invention to provide an improved spacing mechanism for the movable cutters of a slicing machine so constructed and arranged as to avoid the accumulation of bread crumbs and the like between the parts of the apparatus, and to eject or express crumbs that find their way between movable parts of the apparatus.

Another object is to provide spacing mechanism of the character mentioned in which jets or blasts of air are sequentially directed into the mechanism for the purpose of dislodging and ejecting crumbs and the like.

Another object is to provide mechanism for spacing and guiding the movable cutters of an endless band slicing machine including in combination adjustable guide fingers for altering the spacing between the runs of the cutter bands and interchangeable or removable combs, each having fixed guide fingers that engage the cutter bands so that in altering the cutter spacing, the fixed guide comb is removed and, after the adjustable guides have been shifted, another fixed guide comb is placed in the machine to embrace the cutters in the position to which the latter are moved by the adjustable guide fingers. More specifically, the invention aims to provide such a combination of fixed and adjustable guides in which locking means prevents actuation of the adjustable guide mechanism for varying the spacing between the cutters except when the fixed guide combs are removed from the machine.

Another object is to provide improved means for engaging the ends of bread loaves being advanced into the cutters of a bread slicing machine, the loaf guides being so mounted as to be swung into and out of operative position and having a sliding connection with the swingable support for facile removal therefrom.

The invention resides in the novel structure and the combination and arrangement of parts. Objects and advantages other than those specifically set forth above will become apparent from the following detailed description and explanation of the invention which is made in connection with the accompanying drawings, wherein:

Figure 1 is a somewhat diagrammatic vertical sectional view, with parts removed and with parts broken away, taken through a bread slicing machine of the endless band type having blade and loaf guiding means constructed in accordance with the principles of the present invention;

Fig. 2 is a plan view, partly in section and with parts broken away, taken substantially on the line indicated at 2—2 of Fig. 1 and enlarged with respect to that figure;

Fig. 3 is a sectional detail showing the manner in which the ends of the lazy tongs are connected to the slides for actuating the lazy tongs;

Fig. 4 is a fragmentary elevational view of the machine with parts removed, taken substantially on the line 4—4 of Fig. 2 and showing the blade guiding and spacing mechanism and the loaf guiding means;

Fig. 5 is an elevational detail similar to Fig. 4 showing the locking device in released position to permit actuation of the adjustable blade guiding mechanism;

Fig. 6 is a detail view, to show the spring pressed actuating arm of the locking device, taken substantially on the line 6—6 of Fig. 5;

Fig. 7 is a sectional detail showing the spring pressed detent of the locking device;

Fig. 8 is a fragmentary side elevational view, with parts removed and taken substantially on the line 8—8 of Fig. 2, showing the air connections for the rotatable tubes that provide the blasts of air;

Fig. 9 is a sectional detail taken substantially on the line 9—9 of Fig. 8;

Fig. 10 is a foreshortened sectional view, with parts removed, taken substantially on the line 10—10 of Fig. 8;

Fig. 11 is a foreshortened plan view of the blade guiding member or comb having the fixed blade engaging fingers;

Fig. 12 is an elevational detail showing one of the elongated guide elements employed in the adjustable spacing mechanism shown in the preceding drawings;

Fig. 13 is a top or edge view of the guide element shown in Fig. 12;

Fig. 14 is a sectional detail of the guide element shown in Figs. 12 and 13 and taken substantially on the line 14—14 of Fig. 13;

Fig. 15 is a detail view, partly in section and with parts removed, showing one of the swingable guides for engaging a bread loaf end during the movement of such bread loaf to the cutters; and Fig. 16 is a sectional detail taken substantially on the line 16—16 of Fig. 15.

Referring to the drawings by numerals of reference applied to like parts throughout the several views, the slicing machine of the present invention comprises a supporting structure that includes a pair of spaced side frames 1 and 2 between which drums 3 and 4 are mounted for rotation about spaced approximately parallel axes. A multiplicity of endless cutter bands 5 are trained around the drums 3 and 4 in twisted and crossed relation, suitable means being provided for actuating one of the drums to drive the cutters. The articles to be sliced, such as bread loaves, one of which is indicated at A, are advanced to the cutters 5 over an infeed conveyor apron 6 by means of flights, one of which is indicated at 7, mounted between spaced parallel side chains or belts 8. The ends of the loaves A are engaged by spaced parallel side guides 9 mounted on swingable arms 10 pivoted on the oppositely threaded ends of a rotatable bar or shaft 11 journaled in brackets 12 secured to the side frames 1 and 2. Threaded elongated sleeves 13 on the upper ends of the arms 10 are threadedly received on the shaft 11.

Extending transversely across the machine adjacent the discharge end of the infeed conveyor apron 6 is a cross member 15 bolted to the side frames 1 and 2 at 16 and provided with a loaf supporting apron or plate 17 which extends as a continuation of the conveyor apron 6 to support loaves or articles released from the latter as the loaves or articles continue to move into cutters 5 under the pressure of succeeding loaves. A space or gap is provided between the aprons 6 and 17 through which the flights drop or move at the end of their loaf advancing path.

A plurality of bifurcated guide fingers 18 formed of relatively hard wear-resistant steel alloy and individually mounted on elongated guide elements 19 are disposed to extend as a continuation of the loaf supporting plate 17 to underlie and support loaves as the latter move through the cutters 5. Each of the fingers is aligned with the loaf supporting surface of the plate 17 and also with a discharge plate 20 which receives sliced loaves from the cutters 5 and the fingers 8 to support such loaves and convey them away from the cutters.

Each of the guide elements 19 are thin and elongated as shown in Figs. 11 through 13, and may be conveniently formed of aluminum or zinc alloys by die casting or some similar process. These guide elements are disposed in side by side parallel relation on tubular or quill-like parallel supports 21 which are received in aligned openings 22 adjacent the ends of the guide elements. The ends of the quills or tubular supports 21 are retained as by press fitting in sockets formed in bosses 23 of brackets 24 secured to the cross member 15 just inside the frames 1 and 2. The guide elements 19 have elongated centrally disposed openings 25 to receive a lazy tongs 26, this lazy tongs preferably being of the character described in more detail in the copending application Serial No. 260,044 filed March 6, 1931, of Earl C. Vollmer and Frederick A. Herwehe. However, as presently contemplated, the individual bars of the lazy tongs are of sufficient length to cross or have connection with at least eleven other bars thereof, thus providing a rigid structure even when expanded. Pins 27, secured as by press fitting in the pivotal fitting joints of the lazy tongs bars, extend above and below the tongs into elongated slots 28 formed in the guide elements 19 so that upon expansion and contraction of the lazy tongs the guide elements are moved by the pins 27 simultaneously and uniformly toward and away from one another along the supporting quills or tubular members 21.

For actuating the lazy tongs, slides 30 are mounted on spaced parallel bars or rods 31, the latter having their ends received in sockets formed in the end brackets 24 previously mentioned. A rotatable rod or shaft 33 disposed in parallel relation to the bars 31 between the latter has oppositely threaded ends which threadedly receive the slides 30 so that by rotation of the shaft 33 the slides 30 may be moved toward or away from one another. The slides 30 have depending portions 32 to which the centrally located ends of extension bars of the lazy tongs 26 are pivotally connected by pins 34, so that movement of the slides 30 toward and away from one another is operative to contract and expand the lazy tongs.

Extending through each of the quills 21 in telescopic rotatable relation thereto is a tubular air distributing element 35. These tubular elements extend through and beyond one of the journal brackets 24 and have sprockets 36 secured on the projecting ends. Over the sprockets is trained an endless chain 37, by means of which the tubes 35 can be rotated in synchronism. The ends of the tubes 35 opposite the sprockets are closed by suitable plugs. For example, a flanged plug 38 may be used which is pressed into one of the tubes 35 and has a head received within a recess in one of the brackets 24 to prevent endwise movement of the tube, or the plug may be received wholly within one of the tubes 35, as shown by plug 39, the latter being held by a taper pin 40 which also extends through a collar 41 received on an extending end portion of the tube.

In the ends of the tubes 35 opposite the plugs 38 and 39 are hollow plugs 42 retained by pins 43 and having projecting ends formed with conical bearing surfaces 44 that receive mating air couplings or collars 45. The plugs 42 turn in the couplings 45, the latter being held snugly against the conical surface 44 by flat springs 46 retained by nuts 47 threaded onto axial studs 48 projecting from the ends of the plugs 42. An annular groove or channel 49 formed in the conical surface 44 of each of the plugs 42 registers with a passage 50 in the coupling collar 45 so that compressed air reaching the passage 50 through suitable conductors 51 flows into the groove 49 and thence into the interior of the tube 35 through passages 52 in the plug 42. A valve 53 in one of the conductors 51 that supplies compressed air for both of the tubes 35 is arranged for manually turning the air supply on and off as desired.

A series of small holes or apertures 56 are arranged in staggered or spiralled relation or otherwise in the tubes 35 so as to register in succession or at different times with a series of jet or nozzle holes 57 formed in the outer tube or quill 21 as the tubes 35 are rotated. The holes 57 in each of the quills are directed inwardly toward the lazy tongs and toward the opposite quill. Portions of the sides of the guide elements 19 are cut away at 58 to form wedges 59 directed toward the openings 22 that receive the quills 21. The cutaway portions 58 register with the openings 57 as the guide elements are moved along the supporting quills 21 by expansion and contraction of the lazy tongs, so that air issuing in the form of jets through the holes 57 is directed by the slanting sides of the wedges 59 to flow across the lazy tongs and in the spaces between adjacent guide elements, thereby dislodging dust, crumbs and other foreign material that becomes lodged therein. Air issues through the holes 57 in the outer tubes or quills only when the holes 56 in the inner tubes 35 register with the holes in the outer tube. Accordingly, not all of the openings 57 direct air jets between and along the sides of the guide elements 19 at the same time and only a few air jets may be simultaneously in operation. However, as the inner tubes 35 are rotated by the sprockets 36, different numbers of the holes 56 move into registry with the holes 57 in the outer tube or supporting quill so that the positions of the air jets in operation shift longitudinally back and forth along the quills 21.

To increase the effectiveness with which bread crumbs and other foreign material is expressed or ejected from between adjacent guide elements, the latter are formed with beveled or slanting surfaces 60 along the sides of the guide elements 19 adjacent the top and bottom edges and also around the ends of the latter. By this arrangement the spaces intervening between adjacent guide elements when the latter are drawn closely together are wedge shaped, as shown in Fig. 3, so that the pressure of the slanting surfaces 60 against foreign material such as crumbs, forces the latter from between the guide elements.

To rotate the shaft 33, a gear 61 is secured thereon at one end which meshes with a pinion 62 mounted on a short shaft 63 journaled in a bracket 64 secured on the outside of one of the brackets 24. A squared end 65 on the short shaft 63 is adapted to receive a crank or hand wheel (not shown) for turning the same and the pinion 62, thereby rotating the gear 61 and the shaft 33. In this manner the lazy tongs 26 is expanded and contracted as desired to vary the spacing between the guide elements 19, and, when the fixed guides are removed and the cutters 5 are in motion, to shift the cutters along the drums 3 and 4, as will later appear.

A sprocket 66 secured on the end of the shaft 33 opposite the gears 61 drives the chain 37, previously mentioned, to rotate the inner tubes or sleeves 35 in unison with the shaft 33. By this arrangement the rotation of the inside sleeves 35, bringing different numbers of the openings 56 into registry with the jet openings 57 of the supporting gear 21, is effected simultaneously with the expansion and contraction of the lazy tongs so that the crumb dislodging air jets are progressed back and forth along the length of the supporting quills as the guide elements 19 are shifted along the quills. Idling sprocket 67 is secured on a stub shaft 68 attached to one of the brackets 24 adjacent the sprocket 66 to retain the chain 37 in mesh with the sprocket 66.

The brackets 12 that support the threaded shaft 11 for the loaf guide 9 are secured to the side frames 1 and 2 inside the latter and have elongated grooves that receive and guide rack bars 70 actuated in unison by pinions 71 mounted on a common cross shaft 72 that is turned by a hand crank 73, the latter being disposed beyond the side frame 1 on an extension portion of the shaft 72. The lower ends of the rack bar 70 have brackets 74 secured thereto that support a cross member or article hold-down plate 75 that is disposed above the loaf supporting plate or apron 17 previously mentioned and is movable toward and away from the latter upon longitudinal shifting of the rack bar 70 by rotation of the pinions 71.

A removable comb or blade guide comprising slotted fingers 77 that are disposed in spaced parallel relation to one another and attached to a holding bar 78 by screws 79 and pins 80 are mounted on the cross member or hold-down plate 75 by means of a stud 81 fitted with a wing nut 82. The stud 81 is secured to the plate 75 in the center of the machine and extends upwardly from the plate so as to be received in a slot 83 formed in the rear edge of the holding member 78. A number of guide pins 84, also extending upwardly from the plate 75, are received in openings or holes 85 of the bar 78 to position the latter approximately parallel to the plane of the cutting edges of the bands 5.

When it is desired to change the spacing between the cutter bands 5, the holding bar 78 with the guide fingers 77 mounted thereon is removed from the cross member or plate 75 by loosening the wing nut 82 and lifting the bar 78 off the guide pins 84. The drums 3 and 4 are then rotated to drive the cutters 5, and while the latter are in motion, the threaded shaft 33 is rotated by means of a crank or hand wheel on the short shaft 63 to expand or contract the lazy tongs 26. The actuation of the lazy tongs moves the guides 19 along the supporting quills 21 in the direction desired to adjust the spacing between the runs of the cutters 5. Since the cutters are in motion, the change in spacing is transmitted along the length of the cutters to the drums 3 and 4, the cutters progressing over the surfaces of the drums. During the adjustment of the spacing the valve 53 is open so that air under high pressure from a suitable source of supply (not shown) is carried through the conductors 51 to the inner tubes 35, whence it is released through the jet openings 57 to flow between the guides 19 and into and through the lazy tongs 26 in the manner previously described.

To prevent inadvertent rotation of the spacer adjusting shaft 33, a detent 88 is slidingly mounted in a block 89 on one of the brackets 24 adjacent the gear 61. The detent 88 is movable into and out of engagement with the teeth of the gear 61 and a helical compression spring 90 embracing the detent 88 and bearing against shoulders on the latter and on the block 89 normally holds the detent withdrawn from the teeth of the gear and against a pin 91 carried by the block 89 and slidable in a groove 92 formed in the detent.

An elongated bar or member 93 is pivotally connected to a pair of spaced parallel links 94 that are mounted for swinging movement on the upper member of the side frame 1. Thus the bar 93 can be moved toward and away from the upper member of the frame 1 in a plane paralleling the path of the loaves while being maintained in parallel relation to the frame. At the lower end of the bar or member 93 is an arm 95 pivoted on the bar at 96 and held against a lateral extension 97 of the bar by means of a helical compression spring 98 that embraces a bolt 99 having a sliding fit in the extension 97 and is connected to the arm 95 at a point spaced from the pivot 96. As the bar or member 93 is swung from its withdrawn position shown in Fig. 4 upwardly and toward the portion of the frame 1 to which it is connected, the arm 95 is moved against the detent pin 88 to force the latter into locking engagement with the teeth of the gear 61. The spring 98 permits the arm 95 to yield as the detent 88 is moved into locking position, thereby preventing injury or damage to the mechanism. The bar or member 93 is so mounted on the links 94 that it normally drops by gravity to the position shown in Fig. 5, wherein the arm 95 is withdrawn from the detent so that the spring 90 withdraws the detent from the teeth of the gear 61. To hold the bar 93 in the position shown in Fig. 4, wherein the gear 61 is locked against rotation by the detent 88, an extension or finger 100 is secured to the holding bar 78 to extend beyond the end of the latter and engage the underside of the bar 93 when the latter is in gear locking position. Thus when the fixed spacer is locked in place by the wing nut 82, the finger 100 holds the locking bar 93 against the detent 88 to prevent turning of the shaft 33 and actuation of the lazy tongs 26. Hence, inadverent adjustment of the adjustable spacing mechanism is prevented and such adjustment cannot be effected until the fixed comb or blade guide is removed from the machine to release the bar 93 and the detent 88.

The loaf guides 9 previously mentioned are each formed with a pair of laterally extending ears 101 located adjacent the upper edges of the guides and between the ends of the latter. These ears have downwardly opening slots 102 which receive the ends of pins 103 mounted in the lower ends of the swingable arms 10. The lower ends of the arms 10 are curved inwardly toward one another, as indicated at 104, providing substantially horizontal portions 105 that carry the pins 103. The bottom edges of the guides 9 are formed with outwardly directed flanges or lips 106 which underlie depending portions 107 on the horizontal ends 105 of the swingable arms. By this arrangement the guides 9, although connected to the pins 103 merely by the hook-like ears 101, cannot be lifted from the pins until the bottom edges of the guides are first swung inwardly toward one another so that the lips 106 clear the shoulders on the depending portions 107 of the arms. Since the inward swinging of the guides 9 on the holding pins 103 is prevented by engagement with the loaf ends, the guides 9 are adequately located in place except when the operator removes the bread loaves from between the guides, to permit the bottom edges of the guides to be swung inwardly. A support pin 110 is received in a downwardly directed socket formed in the depending portion 107 of each of the swingable arms and rests upon the loaf supporting plate 17 to limit the swinging movement of the arms 10. The support pin 110 may be made of a relatively soft material to prevent injury or marring of the plate 17 and is adjustable as to height by sliding in the socket receiving the same. A set screw 111 threaded into the depending portion 107 is provided to engage and retain the pin 110 in adjusted position. A pad 112 may be formed on the lower edge of each of the guides 9 to engage the loaf supporting plate 17, if desired.

The present invention thus provides in combination in a bread slicing machine of the endless band type an adjustable blade spacing mechanism and a fixed mechanism for guiding and spacing the blades. The combination includes a locking mechanism so arranged that the adjustable spacer cannot be actuated while the fixed blade guide or comb is in position in the machine, thereby preventing damage or injury to the parts. The guides for the loaves moving into the cutters are so arranged as to be readily removed by swinging them away from the cutters and inwardly and upwardly toward one another and without the use of any tools or appliances. The adjustable spacer includes means for directing jets of air between the blade guide elements and the actuating lazy tongs during adjustment of the variable spacer for the purpose of dislodging and expressing bread crumbs and like foreign material from between the parts of the adjustable spacer.

The principles of the present invention may be utilized in various ways, numerous modifications and alterations being contemplated, substitution of parts and changes in construction being resorted to as desired, it being understood that the embodiment shown in the drawings and described above is given merely for purposes of explanation and illustration without intending to limit the scope of the claims to the specific details disclosed.

What I claim is:

1. In a bread slicing machine having thin flexible cutters, a plurality of relatively thin elements disposed in side by side relation and having portions adapted for individually engaging the cutters to space the latter, means supporting the elements for movement toward and away from one another, and means in proximity to said elements for directing streams of air into the spaces between the elements at points spaced from the cutter-engaging portions thereof to prevent accumulation of crumbs between said elements, the confronting sides of the elements being oppositely slanted and diverging in the direction of discharge to facilitate the release of dislodged crumbs.

2. In a bread slicing machine having thin flexible cutters, a plurality of relatively thin elements disposed in side by side relation for individually engaging the cutters to space the latter, a tubular member extending through the elements and supporting the latter for movement toward and away from one another, conduit means for supplying air under pressure to said tubular member, and spaced openings along the tubular member providing outlets for said air in the form of jets to dislodge crumbs from between the spacing elements.

3. In a bread slicing machine having thin flexible cutters, a plurality of relatively thin elements disposed in side by side relation and having portions adapted for individually engaging the cutters to space the latter, and air conducting means extending transversely across the spacing elements, said conducting means having openings disposed to direct air jets into the spaces between the spacing elements at points spaced from the cutter-engaging portions thereof to prevent accumulation of crumbs between said elements.

4. In a bread slicing machine having thin flexible cutters, a plurality of relatively thin elements disposed in side by side relation for individually engaging the cutters to space the latter, and air conducting means extending transversely across the spacing elements, said conducting means including means providing spaced openings along the length of the conducting means to direct air jets between the spacing elements and means for releasing air through the openings serially.

5. In a bread slicing machine having blade spacing elements disposed in side by side relation and means for moving the elements toward and away from one another to vary the blade spacing, a pair of nested tubes disposed across the elements, the outer tube being formed with spaced openings to direct compressed air from the interior of the tubes toward the elements and the inner tube being formed with openings adapted to register serially with the openings in the outer tube during relative rotation of the tubes, conduit means for supplying air under pressure to the inner tube, and means for rotating one of the tubes.

6. In a slicing machine, a supporting structure, a plurality of cutters disposed in side by side relation, a guide assembly removably carried by the structure and engaging the cutters to space the latter, a guide assembly carried by the structure and including a plurality of relatively movable spacing elements and rotatable means having connection with the elements to move the latter toward and away from one another, means movable to a position effecting locking of the rotatable means, and means interconnecting the movable means and the removable guide assembly to hold the movable means in locking position to thereby prevent movement of the spacing elements.

7. In a slicing machine, a supporting structure, a plurality of cutters disposed in side by side relation, a guide assembly removably carried by the structure and engaging the cutters to space the latter, a guide assembly carried by the structure and including a plurality of relatively movable spacing elements and rotatable means having connection with the elements to move the latter toward and away from one another, a pivoted member movable to a position effecting locking of the rotatable means, and means interconnecting the movable means and the removable guide assembly to hold the movable means in locking position and thereby prevent movement of the spacing elements, said pivoted member being movable by gravity to unlock the rotatable member upon removal of the removable guide assembly.

8. In a slicing machine having a supporting structure and a plurality of endless band cutters mounted in side by side relation, an adjustable guide assembly mounted on the structure and having elements for engaging the cutters and rotatable means for moving the elements toward and away from one another, means movable to engage the rotatable means and lock the latter against rotation, a removable guide assembly having means for engaging and spacing the cutters, and means for so mounting the latter assembly on the structure as to hold the movable means in engagement with the rotatable means.

9. A spacer comprising a pair of spaced substantially parallel support members, a plurality of elongated spacer elements disposed in side by side relation and threaded on the support members, a lazy tongs disposed between the support members and extending through openings in the elements, said lazy tongs having connection with the elements to move the latter along the support members, and means for expanding and contracting the lazy tongs.

10. In a bread slicing machine having a supporting structure and a plurality of endless band cutters disposed in side by side relation, a multiplicity of guide elements for individually engaging the cutters to space the latter, a hollow member carried by the supporting structure for supporting the guide elements for movement therealong, rotatable means extending through said hollow member for conducting compressed air therealong and releasing such air to flow over the guide elements, means for moving the guide elements toward and away from one another including a rotatable member, and means connecting the rotatable means to the rotatable member to be actuated by the latter during movement of the guide elements.

11. In a bread slicing machine having a supporting structure and movable cutters, conveyor means for advancing bread loaves to the cutters, a rod having oppositely threaded ends and means mounting the same for rotation on the structure above the conveyor means, a pair of arms threaded on the ends of the rod and swingable thereabout, rails for engaging the ends of bread loaves mounted on the arms for pivotal movement about axes paralleling the direction of bread loaf movement on the conveyor, stop means for limiting the swinging movement of the arms on the rod so disposed that the arms normally rest thereagainst by gravity, and means for rotating the rod to vary the spacing between the arms and the guide rails carried thereby.

12. In a spacer for a bread slicing machine, a tubular support having opening means along one side for releasing compressed air in a fine stream or streams, a plurality of guide elements slidable along the support over the opening means, said elements having relieved portions adjacent the opening means to present narrow edges to air streams issuing therefrom, and means for conducting compressed air to the tubular support.

13. In a spacer for a bread slicing machine, a tubular support having opening means along one side for releasing compressed air in a fine stream or streams, a plurality of guide elements slidable along the support over the opening means, said elements having relieved portions adjacent the opening means to present narrow edges to air streams issuing therefrom, a tube rotatably mounted in said support and formed with a plurality of circumferentially staggered openings adapted to register serially with the opening means in the support, means for rotating said tube, and means for conducting compressed air to the tube.

14. In a spacer for a bread slicing machine, a tubular support having opening means along one side for releasing compressed air in a fine stream or streams, a plurality of guide elements slidable along the support over the opening means, a tube nested within the support and formed with circumferentially staggered openings spaced along the length thereof, means for rotating the tube so that the openings therein register serially with the opening means in the support, and means for conducting compressed air to the tube.

15. In an endless band blade slicing machine having a supporting structure, a spacer comprising a plurality of guide elements disposed in side by side relation, a pair of spaced tubular supports extending through the elements, means for conducting compressed air to the supports, each support being formed with opening means adapted to direct a stream or streams of compressed air toward the other support whereby bread crumbs are dislodged by the air streams from portions of the guide elements extending between the suports, and means extending through the guide elements between the supports and having individual connection with the guide elements to move the latter uniformly and simultaneously toward and away from one another, said guide moving means being disposed in the path of said air stream or streams to be thereby cleaned of bread crumbs.

16. A spacer comprising a pair of spaced parallel supporting bars, a plurality of elongated spacer elements disposed transversely of said supporting bars and slidably mounted thereon, said spacer elements having slots in the portions thereof between said supporting bars, a lazy tongs disposed between said support members, said lazy tongs having pins engaging in said slots, and means for expanding and contracting said lazy tongs.

17. A spacer comprising a pair of spaced parallel supporting bars, a plurality of elongated spacer elements disposed transversely of said supporting bars and slidably mounted thereon, said spacer elements having slots in the portions thereof between said supporting bars, a lazy tongs disposed between said support members, said lazy tongs having pins engaging in said slots, movable brackets having connection with the ends of the lazy tongs, means paralleling said supporting bars for slidingly supporting said brackets, and a rotatable rod having oppositely threaded ends engaging the brackets to move the brackets uniformly and simultaneously toward and away from one another to actuate the lazy tongs.

18. A spacer comprising a pair of spaced parallel supporting bars, a plurality of elongated spacer elements disposed transversely of said supporting bars and slidably mounted thereon, said spacer elements having slots in the portions thereof between said supporting bars, a lazy tongs disposed between said support members, said lazy tongs having pins engaging in said slots, a pair of said pins engaging each spacer element, and means for expanding and contracting said lazy tongs.

ARTHUR A. KOTTMANN.